United States Patent [19]

Schoepke et al.

[11] Patent Number: 5,513,923

[45] Date of Patent: May 7, 1996

[54] CONNECTION PIECE ON THE END OF A WIRE CABLE

[75] Inventors: Daniel Schoepke, Windisch; Urs Schweizer, Niederwil, both of Switzerland

[73] Assignee: Brugg Drahtseil AG, Birr, Switzerland

[21] Appl. No.: 228,094

[22] Filed: Apr. 15, 1994

[30] Foreign Application Priority Data

Apr. 20, 1993 [EP] European Pat. Off. .............. 93106337

[51] Int. Cl.⁶ .................................................... F16G 11/02
[52] U.S. Cl. .......................... 403/301; 403/300; 403/284; 403/282; 29/517
[58] Field of Search ..................... 403/300, 301, 403/305, 306, 307, 308, 282, 279, 278, 274; 24/135 N, 135 R, 136 B, 687; 29/452, 517; 174/84 C

[56] References Cited

U.S. PATENT DOCUMENTS

| | | | |
|---|---|---|---|
| 1,379,966 | 5/1921 | Cook | 29/517 |
| 1,643,110 | 9/1927 | Briggs | 29/517 X |
| 1,908,600 | 5/1933 | Green et al. | 29/517 X |
| 1,979,304 | 11/1934 | Anderson | 29/517 X |
| 2,346,426 | 4/1944 | Hait | 403/301 X |
| 3,920,340 | 11/1975 | Jones et al. | 403/308 X |

FOREIGN PATENT DOCUMENTS

| | | | |
|---|---|---|---|
| 1197581 | 12/1959 | France . | |
| 1260807 | 4/1961 | France . | |
| 2193446 | 2/1974 | France . | |
| 1935996 | 1/1970 | Germany | 29/517 |
| 405784 | 3/1934 | United Kingdom | 29/517 |
| 627834 | 8/1949 | United Kingdom . | |
| 798499 | 7/1958 | United Kingdom . | |
| 977466 | 12/1964 | United Kingdom | 174/84.1 |
| 1258919 | 12/1971 | United Kingdom . | |

*Primary Examiner*—Anthony Knight
*Attorney, Agent, or Firm*—Meltzer, Lippe, Goldstein

[57] ABSTRACT

Connection piece (3), which is mounted on the end of a wire cable (2), for connecting the wire cable (1) to a mounting support taking up tensile forces caused by longitudinal stresses in the wire cable (2), in which the external dimensions of the connection piece (3) in the direction transverse to the extended axis of the wire cable end (1) are substantially equal to or smaller than the diameter of the wire cable (2) and in which the wire cable is compressed in its end region until the wire cable end (1) fits into a cutout (6), provided for receiving the latter, in the connection piece (3).

12 Claims, 1 Drawing Sheet

CONNECTION PIECE ON THE END OF A WIRE CABLE

FIELD OF INVENTION

The invention relates to a connection piece, which is mounted on the end of a wire cable, for connecting the wire cable end to means for taking up tensile forces caused by longitudinal stresses in the wire cable.

BACKGROUND OF THE INVENTION

Connection pieces of this type are generally known (see for example GB-A-798499 and FR-A-1197581) and have been commercially available in standardized sizes for decades in the same way as screws and nuts have. Here, the standardization relates to the diameter of the wire cable for which such a known connection piece is intended. Generally, these known connection pieces substantially have the shape of a cylindrical pin which is provided in its one end region with a thread and in its other end region with a cylindrical cutout which has the diameter of the wire cable for which the connection piece concerned is intended and is coaxial to the pin axis. To mount the connection piece on the wire cable, the wire cable end is introduced into this cutout and the substantially sleeve-shaped end region of the pin-shaped connection piece, with the wire cable end located therein, is then conventionally made into the shape of a regular hexagon and as a result the wire cable end is securely clamped in the sleeve-shaped end region of the connection piece. So that as a result of static friction between the outer surfaces of the wire cable end and the inner wall of the sleeve-shaped end region of the connection piece the tensile force required for loading the wire cable to capacity can here be transmitted from the connection piece to the wire cable, the static friction surface and thus the length of the sleeve-shaped end region or of the wire cable end located therein has to be made relatively large so that the risk of the wire cable end slipping out of the sleeve-shaped end region of the connection piece under tensile load can reliably be eliminated, since the clamping forces or, to be more precise, clamping pressures exerted on the wire cable end on deformation of the sleeve-shaped end region from its (on the introduction of the wire cable end still) cylindrical sleeve shape to the said hexagonal shape are restricted and therefore a relatively large static friction surface is required because of the restricted clamping pressure.

These known connection pieces have long since proved successful and have generally met the requirements made of them, although a smaller length of their sleeve-shaped end regions would have been perfectly desirable. For certain applications, in particular in application cases in which the wire cable provided with the connection piece has to be drawn through leadthroughs (as for example in the case of a fence formed from a plurality of tensioned wire cables running parallel to one another, in which each wire cable is to be drawn through a respective leadthrough in each of a row of "fence posts"), these known connection pieces have the disadvantage, however, that the diameter of the pin-shaped connection piece has to be at least approximately 20% larger than the diameter of the wire cable so that the tensile load of the wire cable can be transmitted to the pin-shaped connection piece without exceeding the breaking load in the sleeve-shaped end region, since this means that the diameter of the leadthroughs also has to be at least approximately 20% larger than the diameter of the wire cable in order also to be able to pass the connection piece through the leadthroughs. However, this produces the disadvantage that the wire cable is not held in the leadthroughs but can move to and fro transversely with respect to the wire cable axis, which, in the above-mentioned example of a wire cable fence in an extreme case (namely if the wire cables did not touch the leadthroughs), could ultimately result in the "fence posts" provided with the leadthroughs being functionless. The case in which the leadthroughs have to be drilled is further disadvantageous, and also the greater technical complexity for producing the leadthroughs arising from the larger diameter of the leadthroughs, and, last but not least, large leadthroughs for thin wire cables are also undesirable for aesthetic reasons.

SUMMARY OF THE INVENTION

The object of the invention is therefore to provide a connection piece of the type mentioned at the outset which is mounted on the end of a wire cable and which does not necessitate leadthroughs of a substantially larger diameter than that of the wire cable and by means of which the disadvantages of leadthroughs which are too large can thus be eliminated and furthermore in which the relatively great length of the sleeve-shaped end regions required in the case of the known connection pieces is no longer necessary, where the length of the connection piece is to be as short as possible.

This object is achieved by a connection piece of the kind mentioned in the beginning, which is characterized in that the external dimensions of the connection piece in the direction transverse to the extended axis of the wire cable end are substantially equal to or smaller than the diameter of the wire cable and the wire cable is compressed in its end region before it is connected to the connection piece until the wire cable end fits into a cutout, provided for receiving the latter, in the connection piece of a smaller opening clearance than the diameter of the wire cable, and in that the external dimensions of the connection piece in the direction of the extended axis of the wire cable end are greater than the length of the compressed wire cable end introduced into the cutout.

The phrase "substantially equal to" used with respect to the external dimensions of the connection piece in the direction transverse to the extended axis of the wire cable end here excludes from the outset external dimensions of the connection piece transverse to the wire cable axis of more than 120% of the wire cable diameter, since connection pieces having diameters which are approximately 20% larger than the wire cable diameter can also be produced, as mentioned above, with the known connection pieces mentioned at the outset. On the other hand, connection pieces having external dimensions transverse to the wire cable axis which are only slightly larger than the wire cable diameter are included in this definition because the wire cable diameter is not a precisely measurable value, but, owing to the highly structured surface of wire cables, is subject to fluctuations, depending on the measuring point at which it is measured, and thus only lies within a certain fluctuation range whereof the mean is generally given as the nominal value of the wire cable diameter. Here, differences between the said external dimensions and the wire cable diameter of a few tenths of a millimeter are considered slight, which in the case of smaller wire cable diameters can result in differences of up to approximately 17.5%.

The main advantage of the present connection piece mounted on the end of a wire cable is that it overcomes the disadvantages associated hitherto with the said leadthroughs which are too large and moreover in particular that it also substantially reduces the technical complexity which can be achieved both indirectly, in the form of a reduced amount of work for drilling leadthroughs having a smaller diameter, and directly, in the form of a smaller expenditure of material for the connection piece as a result of its smaller external dimensions in the transverse and longitudinal directions. The smaller external dimensions in the transverse direction by comparison with the corresponding dimensions of known connection pieces here result from the fact that the external dimensions in the transverse direction in the case of the present connection piece are not, as in the case of the known connection pieces, larger but are only equal to the wire cable diameter, and the smaller external dimensions of the present connection piece in the longitudinal direction by comparison with the corresponding dimensions of known connection pieces are to be attributed to the fact that the above-mentioned relatively great length of the sleeve-shaped end regions required in the case of the known connection pieces is no longer necessary in the case of the present connection piece, since in the case of the present connection piece the wire cable end, before it is actually introduced into the cutout provided in the connection piece, is compressed to a size which fits into the cutout (and thus extremely intensively) and therefore the said clamping pressure which the wire cable end exerts on the inner surfaces of the cutout is substantially larger in the case of the present connection piece than in the case of the known connection pieces, so that the necessary static friction surface between wire cable end and cutout and thus also the length of the cutout in the case of the present connection piece can be made substantially smaller than the said relatively great length of the sleeve-shaped end regions in the case of the known connection pieces (see GB-A-798499).

In a preferred embodiment of the present connection piece mounted on the end of a wire cable, the connection piece substantially has the shape of a pin which is provided in its end region facing the wire cable with a cutout, preferably constructed as a bore, for receiving the compressed wire cable end. The advantage with this preferred embodiment is the one-piece construction of the connection piece and the direct connection provided thereby of the wire cable end to the said means for taking up through the Connection piece tensile forces caused by longitudinal stresses in the wire cable. The one-piece construction of this preferred embodiment, however, necessitates producing the cutout by a swarf-forming shaping operation, preferably by a drilling operation. This expenditure for producing the cutout can be eliminated advantageously by the connection piece substantially having the shape of a sleeve which in its end region facing the wire cable serves to receive the compressed wire cable end and in its end region remote from the wire cable serves to receive an intermediate member which connects the sleeve to the means for taking up tensile forces caused by longitudinal stresses in the wire cable. However, the advantageous elimination of expenditure, produced thereby, for producing the cutout can only be achieved by dispensing with a one-piececonstruction of the connection piece, comprising sleeve and intermediate member in this case.

Particularly advantageously, the present connection piece mounted on the end of a wire cable can be compressed, preferably in the shape of a substantially regular hexagon, in its end region facing the wire cable and serving to receive the compressed wire cable end to increase the static friction between the wire cable end and the cutout wall surrounding the latter. The advantage of such a compression of connection piece and wire cable end located therein from the outside is a further increase in the said clamping pressure, which enables a corresponding further reduction in the length of the cutout and thus of the connection piece.

As far as the construction of the present connection piece in its end region remote from the wire cable is concerned, there are various advantageous possibilities: the connection piece can advantageously have the shape of a pin which is provided with a thread in its end region remote from the wire cable, the means for taking up tensile forces caused by longitudinal stresses in the wire cable preferably comprising a nut which fits onto this thread. This embodiment of the present connection piece in its end region remote from the wire cable corresponds to the construction of the known connection pieces mentioned at the outset. A further expedient possibility consists in the present connection piece having the shape of a pin which is provided with at least one annular groove in its end region remote from the wire cable, the means for taking up tensile forces caused by longitudinal stresses in the wire cable preferably comprising a spring ring which fits into the annular groove. This embodiment has the advantage that a spring ring in an annular groove is substantially less obtrusive than a nut screwed onto a thread, but with only one annular groove it cannot be adjusted at all and with a plurality of annular grooves it can only be adjusted roughly, while a nut screwed onto a thread on the connection piece provides infinitely variable adjustability. The same also applies by analogy to the further advantageous possibility that the present connection piece substantially has the shape of a pin or a sleeve and is provided with at least one transverse hole in its end region remote from the wire cable, the means for taking up tensile forces caused by longitudinal stresses in the wire cable preferably comprising a holding bar, which fits into the transverse hole, of a greater length than the diameter of the pin or of the sleeve.

As far as the dimensions of the present connection piece relative to the diameter of the wire cable on the end of which the connection piece is mounted are concerned, in principle the following applies: the external dimensions of the connection piece in the direction transverse to the extended axis of the wire cable end should be smaller than 1.175 times, preferably smaller than 1.1 times, the diameter of the wire cable. Expediently, the external dimensions of the connection piece in the direction transverse to the extended axis of the wire cable end should here be at most 5% larger than the diameter of the wire cable. Moreover, the internal dimensions of the cutout in the connection piece, serving to receive the compressed wire able end, in the direction transverse to the axis of the wire cable end should expediently be smaller than 0.86 times, preferably smaller than 0.8 times, the diameter of the wire cable.

BRIEF DESCRIPTION OF THE DRAWING

The invention is described in detail below by way of an embodiment with reference to the figures below, in which.

DETAILED DESCRIPTION OF THE INVENTION

Figure 1:
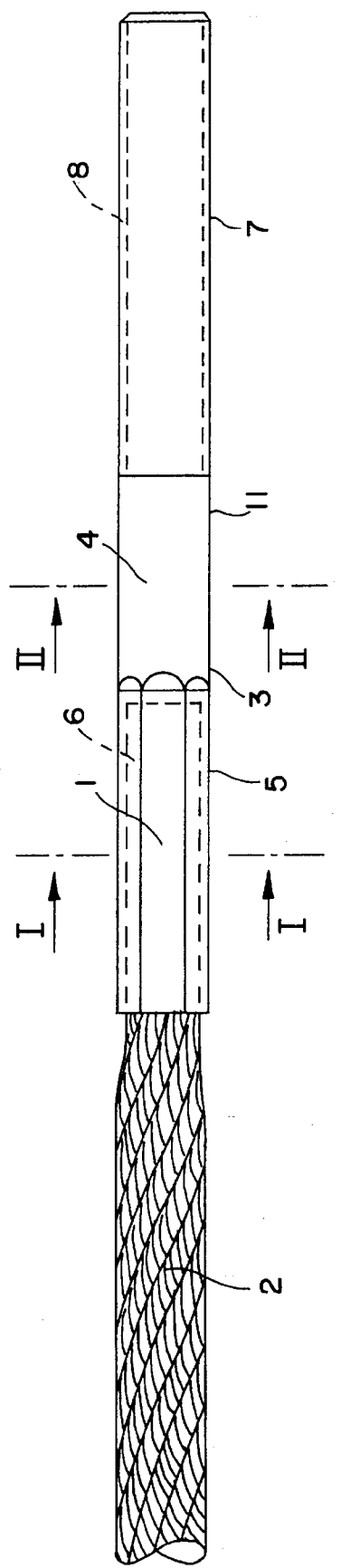
FIG. 1 shows an embodiment of the present connection piece mounted on the end of a wire cable, in side view.
Figure 3:
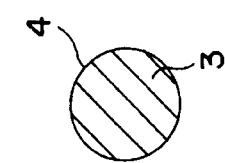
FIG. 3 shows a cross-section of the embodiment in FIG. 1, in the plane of section II—II.
Figure 2:
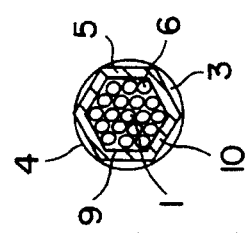
FIG. 2 shows a cross-section of the embodiment in FIG. 1, in the plane of section I—I.

In the embodiment shown in FIG. 1, the one-piece connection piece 3 is mounted on the wire cable end 1 of the wire cable 2 and substantially has the shape of a pin 4 of the same diameter as that of the wire cable 2, provided in its end region 5 facing the wire cable 2 with the cutout 6 serving to receive the wire cable end 1 and provided in its end region 7 remote from the wire cable 2 with the thread 8. The cutout wall 9 delimiting the cutout 6 and surrounding the wire cable end 1 has, as can be seen in FIG. 2, in the state ready for operation shown in FIG. 1 of the connection piece 3 mounted on the end of the wire cable 2 the shape of a substantially regular hexagon 10. The pin 4, from which the present one-piece connection piece 3 is produced, has in the region 11 between its one end region 5 provided with the cutout 6 and its other end region 7 provided with the thread 8 a cylindrical shape with a solid cross-section, as FIG. 3 shows.

The production and mounting of the connection piece 3 on the wire cable end 1 is effected, in the case of the embodiment shown in FIG. 1, as follows: a cylindrical pin of chromium nickel steel of the diameter of the wire cable 2 and the length of the connection piece 3 is provided in its one end region 7 with the thread 8 and is provided in its other end region with a cylindrical bore, coaxial to the pin axis, of a bore diameter corresponding to approximately 0.7 times the pin diameter and a bore depth corresponding to approximately three times the pin diameter, with a diameter of the wire cable 2 and thus also of the pin 4 of 6 mm, i.e. with a bore having a diameter of 4.25 mm and a depth of approximately 20 mm. The wire cable 2 in an end region of a length corresponding approximately to five times the pin diameter is then compressed such that the diameter of the compressed wire cable at the wire cable end 1 over a length corresponding to approximately three times the pin diameter corresponds approximately to 0.7 times the pin diameter and then in the remaining part of the end region continuously merges to the full diameter of the uncompressed wire cable 2.

Subsequently, the wire cable end 1 in the compressed state is introduced into the said cylindrical bore and inserted until it reaches the base of the bore. Then, the connection piece 3, in its end region 5 within which the inserted compressed wire cable end 1 is located, is pressed from the outside into the shape of a substantially regular hexagon 10 in order to increase the static friction between the wire cable end 1 and the wall 9 surrounding the latter, whereby the production and mounting of the connection piece 3 on the wire cable end 1 is complete.

In strength tests with an embodiment of a 6 mm diameter of the wire cable 2 and of the connection piece 3, on application of a tensile load a loading capacity of over 60% of the cable breaking load was achieved and thus almost the same result was achieved as in the known connection pieces of the type mentioned at the outset, with which approximately 70% of the cable breaking load is achieved, at any rate when their diameter is only slightly over 120% of the wire cable diameter. Although this tensile loading capacity can be further increased somewhat in the case of the known connection pieces by a diameter of the connection piece which is substantially larger than the wire cable diameter, a tensile loading capacity of over 100% of the cable breaking load and thus a greater tensile strength of the connection between connection piece and wire cable end than the tensile strength of the wire cable itself (tearing of the wire cable before the breaking of the connection between connection piece and wire cable end with continuously increasing tensile loading) cannot be achieved even with the known connection pieces of the type mentioned at the outset (such tensile strengths can only be achieved with the aid of a cable loop located at the end of the wire cable). In the same way as with tensile strength, with the embodiment which was subjected to testing an endurance limit at complete stress reversal to reversed bending of approximately the same magnitude as in the case of the known connection pieces of the type mentioned at the outset could be achieved, so that with the present connection piece mounted on the end of a wire cable the considerable advantages mentioned at the outset can thus be achieved without having to accept substantial disadvantages and the present connection piece can therefore also be used to great advantage over and above the specific area of application mentioned at the outset.

We claim:

1. Connection piece (3), which is mounted on the end of a wire cable (2), for connecting the wire cable end (1) to means for taking up tensile forces caused by longitudinal stresses in the wire cable (2), characterized in that the external dimensions of the connection piece (3) in the direction transverse to the extended axis of the wire cable end (1) are substantially equal to or smaller than the diameter of the wire cable (2) and the wire cable is compressed in its end region before it is connected to the connection piece (3) until the wire cable end (1) fits into a cutout (6), provided for receiving the latter, in the connection piece (3) of a smaller opening clearance than the diameter of the wire cable (2), and in that the external dimensions of the connection piece (3) in the direction of the extended axis of the wire cable end (1) are greater than the length of the compressed wire cable end (1) introduced into the cutout (6).

2. Connection piece according to claim 1, characterized in that it substantially has the shape of a pin (4) which is provided in its end region (5) facing the wire cable (2) with a cutout (6), formed preferably by drilling, for receiving the compressed wire cable end (1).

3. Connection piece according to claim 1, characterized in that it substantially has the shape of a sleeve which in its end region facing the wire cable serves to receive the compressed wire cable end and in its end region remote from the wire cable serves to receive an intermediate member which connects the sleeve to the means for taking up tensile forces caused by longitudinal stresses in the wire cable.

4. Connection piece according to claim 1, characterized in that the connection piece together with the wire cable end connected thereto is compressed in the shape of a substantially regular hexagon (10) in its end region (5) facing the wire cable (2) and serving to receive the compressed wire cable end (1) to increase the static friction between the wire cable end (1) and the cutout wall (9) surrounding the latter.

5. Connection piece according to claim 1 or 2, characterized in that it substantially has the shape of a pin (4) which is provided with a thread (8) in its end region (7) remote from the wire cable.

6. Connection piece according to claim 1 or 2, characterized in that it substantially has the shape of a pin which is provided with at least one annular groove in its end region remote from the wire cable.

7. Connection piece according to claim 1 or 2, characterized in that it substantially has the shape of a pin or a sleeve and is provided with at least one transverse hole in its end region remote from the wire cable.

8. Connection piece according to claim 1, characterized in that the external dimensions of the connection piece (3) in the direction transverse to the extended axis of the wire cable end (1) are smaller than 1.175 times the diameter of the wire cable (2).

9. Connection piece according to one of claims 1 to 7, characterized in that the external dimensions of the connection piece (3) in the direction transverse to the extended axis of the wire cable end (1) are at most 5% larger than the diameter of the wire cable (2).

10. Connection piece according to claim 1, characterized in that the internal dimensions of the cutout (6) in the connection piece (3), serving to receive the compressed wire cable end (1), in the direction transverse to the axis of the wire cable end (1) are smaller than 0.86 times the diameter of the wire cable (2).

11. Connection piece according to claim 1, characterized in that the external dimensions of the connection piece (3) in the direction transverse to the extended axis of the wire cable end (1) are smaller than 1.1 times the diameter of the wire cable (2).

12. Connection piece according to claim 1, characterized in that the internal dimensions of the cutout (6) in the connection piece (3), serving to receive the compressed wire cable end (1), in the direction transverse to the axis of the wire cable end (1) are smaller than 0.8 times the diameter of the wire cable (2).

* * * * *